US012645762B2

(12) United States Patent
Browder et al.

(10) Patent No.: US 12,645,762 B2
(45) Date of Patent: Jun. 2, 2026

(54) APPARATUS AND METHOD FOR TEXTUAL DATA ANALYSIS AND GENERATION OF A PERFORMANCE DATUM

(71) Applicant: Signet Health Corporation, North Richland Hills, TX (US)

(72) Inventors: Blake Browder, Dallas, TX (US); Joy Figarsky, Little Rock, AR (US)

(73) Assignee: BH Operations, LLC, North Richland Hills, TX (US)

( * ) Notice: Subject to any disclaimer, the term of this patent is extended or adjusted under 35 U.S.C. 154(b) by 0 days.

(21) Appl. No.: 18/957,583

(22) Filed: Nov. 22, 2024

(65) Prior Publication Data

US 2026/0147857 A1 May 28, 2026

(51) Int. Cl.
*G06F 18/2415* (2023.01)
*G06N 20/00* (2019.01)

(52) U.S. Cl.
CPC ......... *G06F 18/2415* (2023.01); *G06N 20/00* (2019.01)

(58) Field of Classification Search
None
See application file for complete search history.

(56) References Cited

U.S. PATENT DOCUMENTS 9,240,120 B2 1/2016 Girardeau et al.
12,046,359 B2 7/2024 Durlach et al.

2008/0306943 A1* 12/2008 Patterson .......... G06F 16/24578
2022/0393875 A1* 12/2022 Shrinivasan .......... H04L 9/3234
2023/0334389 A1 10/2023 Dalley, Jr. et al.

FOREIGN PATENT DOCUMENTS

EP 3276554 A1 1/2018

OTHER PUBLICATIONS

Hunt, Ethan, Ritvik Janamsetty, Chanana Kinares, Chanel Koh, Alexis Sanchez, Felix Zhan, Murat Ozdemir et al. "Machine learning models for paraphrase identification and its applications on plagiarism detection." In 2019 IEEE International Conference on Big Knowledge (ICBK), pp. 97-104. IEEE, 2019. (Year: 2019).*

(Continued)

*Primary Examiner* — Vincent Gonzales
(74) *Attorney, Agent, or Firm* — CALDWELL LLC

(57) ABSTRACT

An apparatus and method for textual data analysis and generation of a performance datum are disclosed. The apparatus includes at least a processor and a memory communicatively connected to the at least a processor, wherein the memory contains instructions configuring the at least a processor to receive input data from a plurality of users, wherein the input data comprises textual data, analyze the textual data as a function of referential textual data, identify a pattern datum between the plurality of segments and the plurality of referential segments, generate a performance datum for each user of the plurality of users as a function of the input data, the pattern datum and a plurality of performance metrics and transmit the performance datum to a plurality of user devices.

20 Claims, 9 Drawing Sheets

(56) References Cited

OTHER PUBLICATIONS

Somers, Rick, Sam Cunningham, Sarah Dart, Sheona Thomson, Caslon Chua, and Edmund Pickering. "AssignmentWatch: An automated detection and alert tool for reducing academic misconduct associated with file-sharing websites." IEEE Transactions on Learning Technologies 17 (2023): 310-318. (Year: 2023).*

Foltýnek, Tomáš, Norman Meuschke, and Bela Gipp. "Academic plagiarism detection: a systematic literature review." ACM Computing Surveys (CSUR) 52, No. 6 (2019): 1-42. (Year: 2019).*

Kruiper R, Kumar B, Watson R, Sadeghineko F, Gray A, Konstas I. A platform-based Natural Language processing-driven strategy for digitalising regulatory compliance processes for the built environment. Advanced Engineering Informatics. Oct. 1, 2024;62:102653 14 pages. (Year: 2024).*

Kulp, Leah, Aleksandra Sarcevic, Yinan Zheng, Megan Cheng, Emily Alberto, and Randall Burd. "Checklist design reconsidered: Understanding checklist compliance and timing of interactions." In Proceedings of the 2020 CHI Conference on Human Factors in Computing Systems, pp. 1-13. 2020. (Year: 2020).*

* cited by examiner

200a

124

116

184

136

John Doe

87

Report History

1. Report 1: XXXX/XX/XX XX:XX:XX

2. Report 2: YYYY/YY/YY YY:YY:YY

3. Report 3: ZZZZ/ZZ/ZZ ZZ:ZZ:ZZ

APPARATUS AND METHOD FOR TEXTUAL DATA ANALYSIS AND GENERATION OF A PERFORMANCE DATUM

FIELD OF THE INVENTION

The present invention generally relates to the field of data analysis. In particular, the present invention is directed to an apparatus and method for textual data analysis and generation of a performance datum.

BACKGROUND

In recent years, there has been a growing need to process and analyze large volumes of textual data. Traditional manual analysis methods are often inefficient and error-prone, especially when dealing with large datasets. Existing techniques don't meet the demands of handling such volumes of data effectively.

SUMMARY OF THE DISCLOSURE

In an aspect, an apparatus for textual data analysis and generation of a performance datum is disclosed. The apparatus includes at least a processor and a memory communicatively connected to the at least a processor, wherein the memory contains instructions configuring the at least a processor to receive input data from a plurality of users, wherein the input data includes textual data, analyze the textual data as a function of referential textual data, wherein analyzing the textual data includes segmenting the textual data and the referential textual data into a plurality of segments and a plurality of referential segments respectively and encoding the plurality of segments and the plurality of referential segments using an encoder, wherein the encoder is configured to convert each segment into a vector representation, identify a pattern datum between the plurality of segments and the plurality of referential segments by comparing the encoded vector representations of the plurality of segments to the encoded referential vector representations of the plurality of referential segments, wherein identifying the pattern datum includes generating pattern training data, wherein the pattern training data includes pairs of texts and corresponding similarity labels indicating whether the pairs are semantically similar, training a pattern machine-learning model using the pattern training data and identifying the pattern datum using the trained pattern machine-learning model as a function of an output of the encoder, generate a performance datum for each user of the plurality of users as a function of the input data, the pattern datum and a plurality of performance metrics and transmit the performance datum to a plurality of user devices.

In another aspect, a method for textual data analysis and generation of a performance datum is disclosed. The method includes receiving, using at least a processor, input data from a plurality of users, wherein the input data includes textual data, analyzing, using the at least a processor, the textual data as a function of referential textual data, wherein analyzing the textual data includes segmenting the textual data and the referential textual data into a plurality of segments and a plurality of referential segments respectively and encoding the plurality of segments and the plurality of referential segments using an encoder, wherein the encoder is configured to convert each segment into a vector representation, identifying, using the at least a processor, a pattern datum between the plurality of segments and the plurality of referential segments by comparing the encoded vector representations of the plurality of segments to the encoded referential vector representations of the plurality of referential segments, wherein identifying the pattern datum includes generating pattern training data, wherein the pattern training data includes pairs of texts and corresponding similarity labels indicating whether the pairs are semantically similar, training a pattern machine-learning model using the pattern training data and identifying the pattern datum using the trained pattern machine-learning model as a function of an output of the encoder, generating, using the at least a processor, a performance datum for each user of the plurality of users as a function of the input data, the pattern datum and a plurality of performance metrics and transmitting, using the at least a processor, the performance datum to a plurality of user devices.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for textual data analysis and generation of a performance datum are disclosed. The apparatus includes at least a processor and a memory communicatively connected to the at least a processor, wherein the memory contains instructions configuring the at least a processor to receive input data from a plurality of users, wherein the input data includes textual data, analyze the textual data as a function of referential textual data, wherein analyzing the textual data includes segmenting the textual data and the referential textual data into a plurality of segments and a plurality of referential segments respectively and encoding the plurality of segments and the plurality of referential segments using an encoder, wherein the encoder is configured to convert each segment into a vector representation, identify a pattern datum between the plurality of segments and the plurality of referential segments by comparing the encoded vector representations of the plurality of segments to the encoded referential vector representations of the plurality of referential segments, wherein identifying the pattern datum includes generating pattern training data, wherein the pattern training data includes pairs of texts and corresponding similarity labels indicating whether the pairs are semantically similar, training a pattern machine-learning model using the pattern training data and identifying the pattern datum using the trained pattern machine-learning model as a function of an output of the encoder, generate a performance datum for each user of the plurality of users as a function of the input data, the pattern datum and a plurality of performance metrics and transmit the performance datum to a plurality of user devices.

Aspect of this disclosure may improve accuracy and may reduce time and effort needed for textual data analysis, solving the technical problem of inefficient and error-prone manual analysis.

Aspects of the present disclosure can be used to identify duplicate content across a plurality of sets of texts using text analysis techniques. By analyzing similarities between vectors and/or segments of texts, duplicated phrases, sentences, or sections can be detected even if the wording is slightly altered.

Exemplary embodiments illustrating aspects of the present disclosure are described below in the context of several specific examples.

Figure 1:
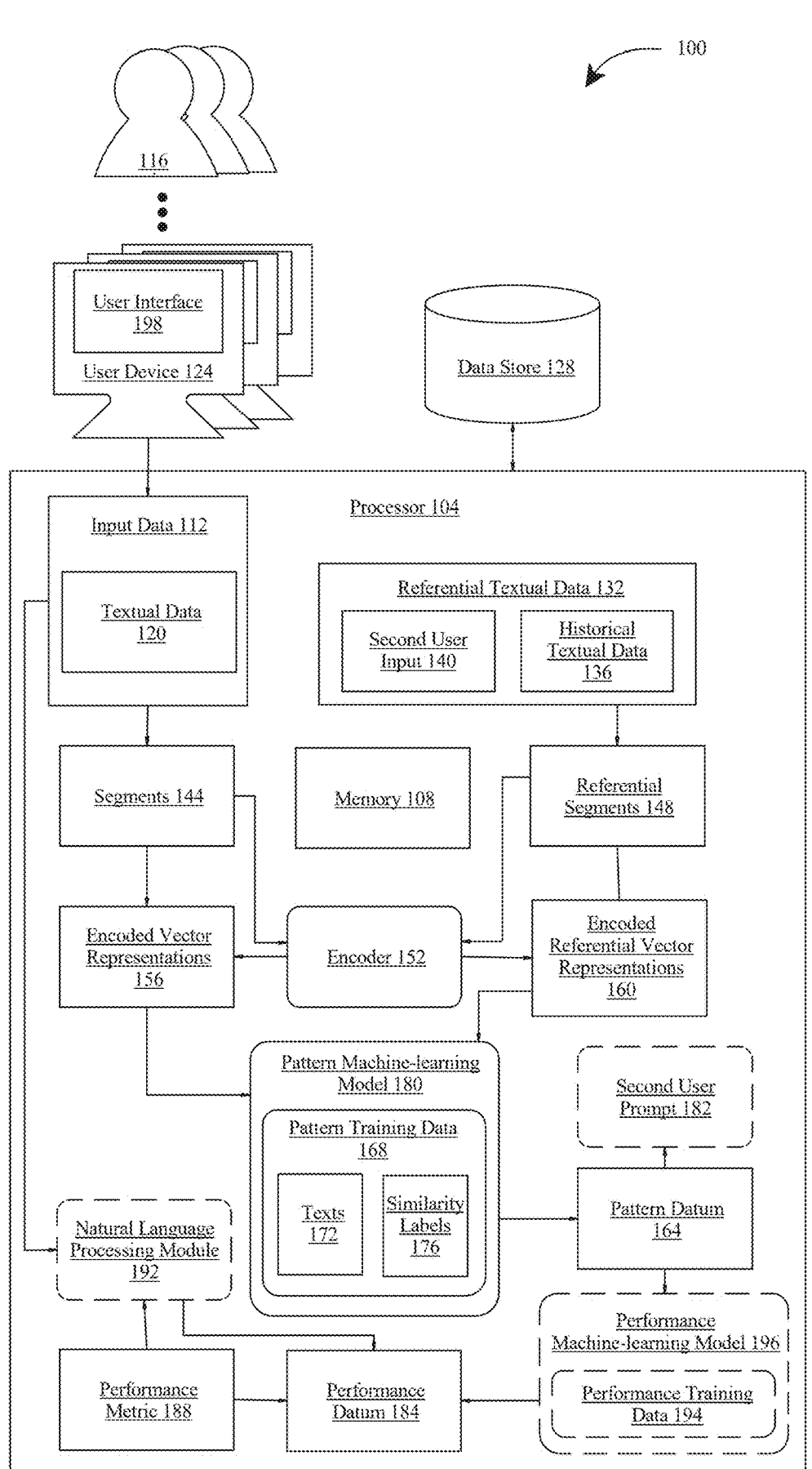
FIG. 1 illustrates a block diagram of an exemplary apparatus for textual data analysis and generation of a performance datum.

Referring now to FIG. 1, an exemplary embodiment of an apparatus 100 for textual data analysis and generation of a performance datum is illustrated. Apparatus 100 includes at least a processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/ or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 108 communicatively connected to processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 contains instructions configuring processor 104 to receive input data 112 from a plurality of users 116. For the purposes of this disclosure, "input data" is data that is input into an apparatus by a user, directly or indirectly. For the purposes of this disclosure, a "user" is any entity that interacts with apparatus 100. As a non-limiting example, user 116 may include an individual, organization, facility, group of individuals, and the like. For example, and without limitation, user may include a worker or staff that works in a facility. In some embodiments, input data 112 may include information collected during a checkup or inspection (e.g., environmental round) of a facility's environment, aimed at ensuring compliance with safety, health, and regulatory requirements. For the purposes of this disclosure, a "facility" is a physical location or building. As a non-limiting example, a facility may include hospital, factory, health care center, behavioral health center, and the like. For the purposes of this disclosure, "environmental round" is a systematic inspection or checkup of a facility's physical environment. Environmental round may ensure compliance of a facility with safety regulations, operational standards, and regulatory requirements.

With continued reference to FIG. 1, in some embodiments, input data 112 may include various format. As a non-limiting example, input data 112 may include numbers, images, audio, video, or structured data (e.g., tables or databases). In some embodiments, input data 112 may include structured data such as checklist inputs by marking items as "completed," "compliant," "non-compliant," or "requires attention." For example, and without limitation, fields may include fire extinguisher checks, emergency exit clearance, and equipment functionality and each item on a checklist may represent a specific environmental or safety requirement that needs to be verified, and the data entered may be used as input data 112. In some embodiments, input data 112 may include images that was inputted by a user 116. Input data 112 includes textual data 120. For the purposes of this disclosure, "textual data" is data that is in a text format. In some embodiments, textual data 120 may include any text written in natural language or symbolic representations like alphanumeric codes. As a non-limiting example, textual data 120 may be related to environmental rounds that are conducted periodically to assess different aspects of the hospital's physical environment, such as cleanliness, equipment functionality, hazard detection, and adherence to safety protocols. For example, and without limitation, textual data 120 may include comments, descriptions or detailed report related to environmental rounds.

With continued reference to FIG. 1, in some embodiments, processor 104 may receive input data 112 from a user device 124. For the purposes of this disclosure, a "user device" is any device a user use to input any data. As a non-limiting example, user device 124 may include a laptop, desktop, tablet, mobile phone, smart phone, smart watch, kiosk, screen, smart headset, or things of the like. In some embodiments, user device 124 may include an interface configured to receive inputs from a user 116. In some embodiments, user 116 may manually input any data into apparatus 100 using user device 124. In some embodiments, user 116 may have a capability to process, store or transmit any information independently.

With continued reference to FIG. 1, input data 112 may be obtained from a chatbot operating on or communicating with a user device 124. For the purposes of this disclosure, "chatbot" is an artificial intelligence (AI) program designed to simulate human conversation or interaction through text, voice-based or image-based communication. The chatbot is further described in detail with respect to FIG. 3. In some embodiments, processor 104 may retrieve input data from a data store 128. The data store 128 disclosed herein is further described below.

With continued reference to FIG. 1, memory 108 contains instructions configuring processor 104 to analyze textual data 120 as a function of referential textual data 132. For the purposes of this disclosure, "referential textual data" is text-based information that acts as a reference to textual data. As a non-limiting example, referential textual data 132 may include comments, descriptions, or detailed report related to environmental round. In some embodiments, referential textual data 132 may include historical textual data 136. For the purposes of this disclosure, "historical textual data" is textual data that has been recorded and archived from past events, or observations. As a non-limiting example, historical textual data 136 may be previously input comments, descriptions, or detailed report related to environmental round by users 116. In some embodiments, referential textual data 132 may include a second user input 140. For the purposes of this disclosure, a "second user input" is any information inputted by a second user. For the purposes of this disclosure, a "second user" is any individual, organization, or entity that is not a user. As a non-limiting example, if a user 116 is an employee, second user may be an employer. For example, and without limitation, a second user may provide a template of comments, descriptions, or detailed report to a user 116 as a reference.

With continued reference to FIG. 1, in some embodiments, apparatus 100 may include a data store 128. In some embodiments, processor 104 may retrieve data from data store 128. As a non-limiting example, processor 104 may retrieve input data 112, textual data 120, and the like. As another non-limiting example, processor 104 may retrieve referential textual data 132, historical textual data 136, second user input 140, and the like. As used in this disclosure, "data store" is a data structure configured to store data for apparatus 100. In one or more embodiments, data store 128 may include inputted or calculated information and datum related to textual data 120. In some embodiments, a datum history may be stored in data store 128. As a non-limiting example, the datum history may include real-time and/or previous inputted data related to textual data 120. As a non-limiting example, data store 128 may include instructions from a user, who may be an expert user, a past user in embodiments disclosed herein, or the like, where the instructions may include examples of the data related to textual data 120.

With continued reference to FIG. 1, in some embodiments, processor 104 may be communicatively connected with data store 128. For example, and without limitation, in some cases, data store 128 may be local to processor 104. In another example, and without limitation, data store 128 may be remote to processor 104 and communicative with processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. The network may use an immutable sequential listing to securely store data store 128. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, data store 128 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, referential textual data 132 may be derived from a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate web crawler to scrape referential textual data 132 from website. The web crawler may be seeded and/or trained with a reputable website to begin the search. Web crawler may be generated by processor 104. In some embodiments, web crawler may be trained with information received from user through a user interface. In some embodiments, web crawler may be configured to generate a web query. A web query may include search criteria received from user. For example, user may submit a plurality of websites for web crawler to search to referential textual data 132. Additionally, web crawler function may be configured to search for and/or detect one or more data patterns. A "data pattern" as used in this disclosure is any repeating forms of information. In some embodiments, web crawler may be configured to determine the relevancy of a data pattern. Relevancy may be determined by a relevancy score. A relevancy score may be automatically generated by processor 104, received from a machine learning model, and/or received from user. In some embodiments, a relevancy score may include a range of numerical values that may correspond to a relevancy strength of data received from a web crawler function. As a non-limiting example, a web crawler function may search the Internet for referential textual data 132.

With continued reference to FIG. 1, analyzing textual data 120 includes segmenting textual data 120 and referential textual data 132 into a plurality of segments 144 and a plurality of referential segments 148 respectively. For the purposes of this disclosure, a "segment" is a portion or section of text in textual data. For the purposes of this disclosure, a "referential segment" is a portion or section of text in referential textual data. For example, and without limitation, if textual data 120 and/or referential textual data 132 includes "One extinguisher near Room 204 is past its expiration date and needs replacement." segment 144 and/or referential segment 148 may include "extinguisher near Room 204" "past its expiration date" and "need replacement." In some embodiments, segment 144 and/or referential segment 148 may be stored in data store 128. In some embodiments, processor 104 may retrieve segment 144 and/or referential segment 148 from data store 128.

With continued reference to FIG. 1, in some embodiments, processor 104 may use a language processing module to find a keyword. The language processing module may be configured to extract, from the one or more documents, one or more words. One or more words may include, without limitation, strings of one or more characters, including without limitation any sequence or sequences of letters, numbers, punctuation, diacritic marks, symbols, abbreviations, formulas, spaces, whitespace, and other symbols, including any symbols usable as textual data 120 or referential textual data 132. Textual data 120 or referential textual data 132 may be parsed into tokens, which may include a simple word (sequence of letters separated by whitespace) or more generally a sequence of characters as described previously. In some embodiments, segments 144 and/or referential segments 148 may include one or more tokens. In a non-limiting example, processor 104 may segment textual data 120 and/or referential textual data 132 based on tokens. The term "token," as used herein, refers to any smaller, individual groupings of text from a larger source of text; tokens may be broken up by word, pair of words, sentence, or other delimitation. These tokens may in turn be parsed in various ways. Textual data 120 or referential textual data 132 may be parsed into words or sequences of words, which may be considered words as well. Textual data 120 or referential textual data 132 may be parsed into "n-grams", where all sequences of n consecutive characters are considered. Any or all possible sequences of tokens or words may be stored as "chains," for example for use as a Markov chain or Hidden Markov Model.

With continued reference to FIG. 1, language processing module may operate to produce a language processing model. Language processing model may include a program automatically generated by processor 104 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, processor 104 may automatically obtain the document using such an identifier, for instance by submitting a request to a database or compendium of documents such as JSTOR as provided by Ithaka Harbors, Inc. of New York.

With continued reference to FIG. 1, analyzing textual data 120 includes encoding a plurality of segments 144 and a plurality of referential segments 148 using an encoder 152. For the purposes of this disclosure, an "encoder" is a component or system that transforms input data from texts into a numerical representation or vector format. In some embodiments, encoder 152 may include recurrent neural network (RNN) encoder, long short-term memory (LSTM) encoder, transformer encoder, autoencoder, and the like. For the purposes of this disclosure, "encoding" refers to a process of transforming data from one format or structure into another. Encoder 152 is configured to convert each segment of a plurality of segments 144 and a plurality of referential segments 148 into a vector representation (e.g., encoded vector representation 156 and encoded referential vector representation 160 respectively). For the purposes of this disclosure, a "vector representation" is a vector format of textual information. For the purposes of this disclosure, an "encoded vector representation" is a vector format of a plurality of segments of textual data. For the purposes of this disclosure, an "encoded referential vector representation" is a vector format of a plurality of referential segments of referential textual data. For example, and without limitation, processor 104 may input 'fire extinguisher' (segment 144 and/or referential segment 148) into an encoder 152 and output [0.2, −0.3, 0.5, 0.7, . . . , −0.1](encoded vector representation 156 and/or encoded referential vector representation 160). In some embodiments, encoded vector representation 156 and encoded referential vector representation 160 may be stored in data store 128 and encoded vector representation 156 and encoded referential vector representation 160 may be retrieved from data store 128.

With continued reference to FIG. 1, in some embodiments, analyzing textual data 120 may include analyzing textual data 120 using bidirectional encoder representations from transformers (BERT). In some embodiments, encoder 152 may include BERT. In an embodiment, BERT may implement a transformer architecture having an "attention mechanism" configured to dynamically determine and assign weight e.g., importance of different tokens such as text characters, words, nucleotides, kmers, or the like. Exemplary attention mechanism may include, without limitation, generalized attention self-attention, multi-head attention, additive attention, global attention, and the like. In some cases, transformer architecture may be implemented as an encoder-decoder structure having an encoder configured to map an input sequence to a higher dimensional space i.e., a sequence of continuous representations, and a decoder configured to transform output of the encoder into a final output sequence, such as without limitation an embedding representing a nucleotide sequence. In other cases, transformer architecture may include only an encoder stack. As a non-limiting example, BERT may include a plurality of layers each contains one or more sub-layers, wherein a first sub-layer may include a multi-head self-attention mechanism, and a second sub-layer may include a position-wise fully connected feed-forward network. In some cases, plurality of layers may be identical. In some cases, multi-head self-attention mechanism may configure BERT to focus on different parts of the input sequence when predicting elements of an embedding to be output; for instance, and without limitation, self-attention mechanism may be described by an attention function:

$$\text{Attention } (Q, K, V) = \text{softmax}\left(\frac{QK^T}{\sqrt{d_k}}\right)V$$

Where Q, K, and V represent a set of queries, keys, and values matrices respectively, and $d_k$ is the dimensionality of the keys. In a non-limiting embodiment, in the context of analysis of RNA, a self-attention mechanism may take output of previous layer X and produce outputs C, using weight matrices $W_i^V$ based on query matrix $$Q_i = [q_1^i, \ldots, q_n^i],$$

key matrix $$K_i = [k_1^i, \ldots, k_n^i],$$

and value matrix $$V_i = [v_1^i, \ldots, v_n^i]$$

as follows:

$$C = \text{Concat}(\text{head}_1, \ldots, \text{head}_H)W^O (\text{inner product with the } W \text{ one})$$

$$\text{head}_i = \text{softmax}\left(\frac{(Q_i)(K_i)^T}{\sqrt{D}}\right)V_i$$

where $$Q_i = XW_i^Q, K_i = XW_i^K, V_i = XW_i^V$$

representing inner products with sets of weights $$W_i^Q, W_i^K, \text{ and } W_i^V,$$

which are the weights to be tuned when training BERT. These matrices may be of size D×D that where D is the input and output vector dimension, which may be, as a non-limiting example, 120 elements. In the above-described example, each head may calculate a subsequent hidden state by computing an attention-weighted sum of a value vector v.

In some cases, and still referring to FIG. 1, position-wise fully connected feed-forward network within second sub-layer of each layer may apply a linear transformation to each position separately and identically, for example, and without limitation, position-wise fully connected feed-forward network may be configured to process the output of the attention mechanism according to equation FFN(x)=max(0, xW₁+b₁)W₂+b₂, where W₁, W₂, b₁, and b₂ are parameters of the feed-forward and x is the input to the feed-forward network. In other words, second sub-layer may include two convolutions with a kernel size 1 and a ReLu activation in between.

With continued reference to FIG. 1, in one or more embodiments, BERT's input representation may combine a plurality of embeddings of tokens, segments, and/or positions. In some cases, each token may be processed, for example and without limitation, through a WordPiece tokenization. Output of BERT may include a fixed-length vector that represents the input token's contextual relationships that suitable for downstream tasks, such as, without limitation, processes describe above. In some cases, implementing BERT for generation of representations of may include pre-training (bidirectionally) which involves one or more unsupervised tasks; for instance, and without limitation, processor 104 may be configured to execute a Masked Language Model (MLM) and a Next Sentence Prediction (NSP). In a non-limiting example, at least a portion of nucleotide sequence in each nucleotide sequence example may be randomly masked, and the model may learn to predict masked nucleotide sequence portions based on the context. NSP may train the model to predict, for example, and without limitation, whether two given subsequences logically follow each other. Additionally, BERT may be fine-tuned to adapt pre-trained representations. In some cases, fine-tuning BERT may include iteratively training BERT's parameters on structural alignment learning and/or masked language model learning with minimal adjustments required from the pre-trained model as described above; for instance, and without limitation, a loss function used for fine-turning may be represented as:

$$L = -\log\left(\frac{e^{s(correct)}}{\sum_{j}^{n} e^{s(j)}}\right)$$

Wherein L is the loss, s(correct) is the score of the correct label, and s(j) is the score of each possible label. It should be noted that other exemplary downstream tasks e.g., sentiment analysis, question answering, named entity recognition (NER), among others may be adapted and optimized based on the apparatus and methods described in this disclosure. As a person skilled in the art, upon reviewing the entirety of this disclosure, will be well versed in the model architectures, including multi-head self-attention mechanism and position-wise fully connected feed-forward network as described herein.

With continued reference to FIG. 1, memory 108 contains instructions configuring processor 104 to identify a pattern datum 164 between a plurality of segments 144 and a plurality of referential segments 148 by comparing encoded vector representations 156 of the plurality of segments 144 to encoded referential vector representations 160 of the plurality of referential segments 148. For the purposes of this disclosure, a "pattern datum" is a data element that indicates a recurring or duplicated relationship between encoded vector representation and encoded referential vector representation. In some embodiments, processor 104 may identify pattern datum 164 when encoded vector representation 156 and encoded referential vector representation 160 exhibit similarity. In some embodiments, processor 104 may identify pattern datum 164 using cosine similarity, Euclidean distance, Jaccard similarity, Manhattan distance, and the like. In some embodiments, pattern datum 164 may include shared or repeated content across encoded vector representation 156 and encoded referential vector representation 160. For example, and without limitation, if textual data 120 and referential textual data 132 both contain the sentence, "The floor near the entrance is wet," encoded vector representation 156 and encoded referential vector representation 160 will be similar or same, then processor 104 may capture this similarity as a pattern datum 164. In a non-limiting example, processor 104 may detect content in texts (e.g., textual data 120) that has been copied and pasted from other texts (e.g., referential textual data 132), identifying duplicated segments. In another non-limiting example, processor 104 may detect content in texts being used over and over again. In some embodiments, pattern datum 164 may include a degree of similarity between encoded vector representation 156 and encoded referential vector representation 160. As a non-limiting example, pattern datum 164 may include a similarity score. For the purposes of this disclosure, a "degree of similarity" or "similarity score" is a measure of how closely encoded vector representation and encoded referential vector representation align in the vector space. For example, and without limitation, encoded vector representation 156 [0.4, 0.7, −0.2, 0.3] and encoded referential vector representation 160 [0.42, 0.68, −0.22, 0.32] may include a similarity score of 0.98. In some embodiments, pattern datum 164 may be stored in data store 128 and pattern datum 164 may be retrieved from data store 128. In some embodiments, a user may manually input pattern datum 164 into apparatus 100.

With continued reference to FIG. 1, identifying pattern datum 164 includes generating pattern training data 168, wherein the pattern training data 168 includes pairs of texts 172 and corresponding similarity labels 176 indicating whether the pairs are semantically similar, training a pattern machine-learning model 180 using the pattern training data 168 and identifying the pattern datum 164 using the trained pattern machine-learning model 180 as a function of an output (e.g., encoded vector representation 156 and encoded referential vector representation 160) of an encoder 152. For the purposes of this disclosure, "pattern training data" is data containing correlations that a machine-learning process may use to model relationships between texts and similarity labels. For the purposes of this disclosure, a "pattern machine-learning model" is a machine-learning model that identifies a pattern datum. In some embodiments, pattern training data 168 may be stored in data store 128. In some embodiments, pattern training data 168 may be received from one or more users, data store 128, external computing devices, and/or previous iterations of processing. As a non-limiting example, pattern training data 168 may include instructions from a user, who may be an expert user, a past user in embodiments disclosed herein, or the like, which may be stored in memory and/or stored in data store 128, where the instructions may include labeling of training examples. In some embodiments, pattern training data 168 may be updated iteratively on a feedback loop. As a non-limiting example, processor 104 may update pattern training data 168 iteratively through a feedback loop as a function of segments 144, referential segments 148, encoded vector representation 156, encoded referential vector representation 160, input data 112, textual data 120, referential textual data 132, an output of encoder 152, or the like. In some embodiments, identifying pattern datum 164 may include iteratively updating pattern training data 168 as a function of textual data 120 by adding correlations between textual data 120 and pattern datum 164. In some embodiments, generating pattern machine-learning model 180 may include training, retraining, or fine-tuning pattern machine-learning model 180 using pattern training data 168 or updated pattern training data 168. In some embodiments, processor 104 may be configured to identify pattern datum between the plurality of segments and the plurality of referential segments using pattern machine-learning model 180 (i.e. trained or updated pattern machine-learning model 180).

With continued reference to FIG. 1, in some embodiments, user 116 related to segments 144, referential segments 148, encoded vector representation 156, encoded referential vector representation 160, input data 112, textual data 120, or referential textual data 132 may be classified to a user cohort using a cohort classifier. Cohort classifier may be consistent with any classifier discussed in this disclosure. Cohort classifier may be trained on cohort training data, wherein the cohort training data may include user data correlated to user cohorts. In some embodiments, a user may be classified to a user cohort and processor 104 may identify pattern datum 164 based on the user cohort using a machine-learning module as described in detail with respect to FIG. 4 and the resulting output may be used to update pattern training data 168. In some embodiments, generating training data and training machine-learning models may be simultaneous.

With continued reference to FIG. 1, in some embodiments, identifying pattern datum 164 may include generating a second user prompt 182 as a function of pattern datum 164, wherein pattern datum 164 may include dissimilarity between a plurality of segments 144 and a plurality of referential segments 148 and/or between encoded vector representation 156 and encoded referential vector representation 160. For the purposes of this disclosure, "dissimilarity" between a plurality of segments and a plurality of referential segments and/or between encoded vector representation and encoded referential vector representation refers to a degree of difference between a plurality of segments and a plurality of referential segments and/or between encoded vector representation and encoded referential vector representation. In a non-limiting example, two different users 116 may input textual data 120 that is related to different environmental round or subject, which may indicate that one of them input incorrect textual data 120. For example, and without limitation, in the context of environmental round that is related to a hospital, if one user's textual data 120 is related to safety and compliance of hospital and another user's textual data 120 is related to safety and compliance of construction site, then processor 104 may determine that the textual data 120 that is related to construction site is inappropriate. In some embodiments, pattern datum 164 may include a dissimilarity score. For the purposes of this disclosure, a "degree of dissimilarity" or "dissimilarity score" is a measure of how different a plurality of segments and a plurality of referential segments and/or encoded vector representation and encoded referential vector representation. For the purposes of this disclosure, a "second user prompt" is a prompt that can be sent to a second user to notify or alert the second user. As a non-limiting example, second user prompt 182 may include a notification, message, and the like. In a non-limiting example, second user prompt 182 may include a notification that indicating a second user that there is a user 116 has submitted input data 112 or textual data 120 that has a lot of similarities (e.g., meaning that the user 116 used previous input data 112 or textual data 120 [copied and pasted]) or a user 116 has submitted input data 112 or textual data 120 that is not relevant to a task or environmental round that is assigned to the user 116.

With continued reference to FIG. 1, in some embodiments, processor 104 may generate second user prompt 182 using a large language model (LLM). A "large language model," as used herein, is a deep learning algorithm that can recognize, summarize, translate, predict and/or generate text and other content based on knowledge gained from massive datasets. LLM may be a type of generative artificial intelligence (AI). LLMs may be trained on large sets of data; for example, training sets may include greater than 1 million words. Training sets may be drawn from diverse sets of data such as, as non-limiting examples, novels, blog posts, articles, emails, and the like. Training sets may include a variety of subject matters, such as, as nonlimiting examples, medical tests, romantic ballads, beat poetry, emails, advertising documents, newspaper articles, and the like. LLMs, in some embodiments, may include GPT, GPT-2, GPT-3, and other language processing models. LLM may be used to augment the text in an article based on a prompt. Training data may correlate content data to plurality of prompts. Training data may correlate elements of a dictionary related to linguistics, as described above, to a prompt. LLM may include a text prediction based algorithm configured to receive an article and apply a probability distribution to the words already typed in a sentence to work out the most likely word to come next in augmented articles. For example, if the words already typed are "Nice to meet", then it is highly likely that the word "you" will come next. LLM may output such predictions by ranking words by likelihood or a prompt parameter. For the example given above, the LLM may score "you" as the most likely, "your" as the next most likely, "his" or "her" next, and the like.

Still referring to FIG. 1, LLM may include an attention mechanism, utilizing a transformer. LLM may include a transformer architecture. In some embodiments, encoder component of LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM may predict the next word by searching for a set of position in a source sentence where the most relevant information is concentrated. LLM may then predict the next word based on context vectors associated with these source positions and all the previous generated target words, such as textual data of a dictionary correlated to a prompt in a training data set.

Still referring to FIG. 1, an attention mechanism may include generalized attention self-attention, multi-head attention, additive attention, global attention, and the like. In generalized attention, when a sequence of words or an image is fed to LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM may pick up particular parts at different positions in the input sequence and over time compute an initial composition of the output sequence. In multi-head attention, LLM may include a transformer model of an attention mechanism. Attention mechanisms, as described above, may provide context for any position in the input sequence. For example, if the input data is a natural language sentence, the transformer does not have to process one word at a time. In multi-head attention, computations by LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), LLM may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM may either attend to all source words or predict the target sentence, thereby attending to a smaller subset of words.

With continued reference to FIG. 1, multi-headed attention in encoder may apply a specific attention mechanism called self-attention. Self-attention allows the models to associate each word in the input, to other words. So, as a non-limiting example, the LLM may learn to associate the word "you", with "how" and "are". It's also possible that LLM learns that words structured in this pattern are typically a question and to respond appropriately. In some embodiments, to achieve self-attention, input may be fed into three distinct fully connected layers to create query, key, and value vectors. The query, key, and value vectors may be fed through a linear layer; then, the query and key vectors may be multiply using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am", decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filed with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the SoftMax of this matrix is taken, the negative infinities will be zeroed out; this leaves "zero" attention scores for "future tokens."

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classes will be of size 10,000. The output of this classifier may be fed into a SoftMax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token. In some embodiment, decoder may be stacked N layers high, with each layer taking in inputs from the encoder and layers before it. Stacking layers may allow LLM to learn to extract and focus on different combinations of attention from its attention heads.

With continued reference to FIG. 1, in some embodiments, LLM may be specifically trained using large language model (LLM) training data. In some embodiments, LLM training data may include correlations between exemplary pattern data and exemplary second user prompts. In some embodiments, LLM training data may include a set of data that is in second user's voice, email, or the like to mimic them. In some embodiments, LLM training data may be consistent with any training data described in the entirety of this disclosure. In some embodiments, LLM training data may be received from one or more users, data store 128, external computing devices, and/or previous iterations of processing. As a non-limiting example, LLM training data may include instructions from a user, who may be an expert user, a past user in embodiments disclosed herein, or the like, which may be stored in memory and/or stored in data store 128, where the instructions may include labeling of training examples. In some embodiments, LLM training data may be updated iteratively through a feedback loop. As a non-limiting example, LLM training data may be updated iteratively through a feedback loop as a function of newly collected input data 112, textual data 120, referential textual data 132, segments 144, referential segments 148, pattern datum 164, output of machine-learning models described herein, or the like. In some embodiments, processor 104 may be configured to generate LLM. In a non-limiting example, generating LLM may include training, retraining, or fine-tuning LLM using LLM training data or updated LLM training data. In some embodiments, processor 104 may be configured to generate second user prompt 182 using LLM (i.e. trained or updated LLM).

With continued reference to FIG. 1, memory 108 contains instruction configuring processor 104 to generate a performance datum 184 for each user of a plurality of users 116 as a function of input data 112, pattern datum 164 and a plurality of performance metrics 188. For the purposes of this disclosure, a "performance datum" is a data element that indicates a quantitative measure of input data of a user. In a non-limiting example, performance datum 184 may reflect the quality of input data 112 or textual data 120, assessing factors (e.g., performance metrics 188) such as completeness, level of detail, and timeliness of the user's observations during the round. In an embodiment, performance datum 184 may be a quantitative characteristic, such as a numerical value within a set range. As a non-limiting example, performance datum 184 may be 0, 1, 2, 3, 5, 10, 20, 100, and the like. As another non-limiting example, performance datum 184 may be a '2' for a score range of 0-10, where '0' may represent a user 116 having a minimum and/or poor quality of input data 112 (e.g., textual data 120) and '10' represents the user 116 having excellent quality of input data 112. In other non-limiting embodiments, performance datum 184 may be a quality characteristic, such as a color coding, where each color is associated with a level of quality of input data 112. As a non-limiting example, performance datum 184 may be red, where red may represent minimum and/or poor quality of input data 112 (e.g., textual data 120). As another non-limiting example, performance datum 184 may be green, where green may represent excellent quality of input data 112. As another non-limiting example, performance datum 184 may be light grey when there is no user activity and the color may get darker as a number of the user activity increases. In some embodiments, performance datum 184 may include low to high scoring. As a non-limiting example, performance datum 184 may be 'low' when there is minimum and/or poor quality of input data 112 and performance datum 184 may be 'high' when quality of input data 112 is high or excellent. In some embodiments, performance datum 184 may be updated in real-time as the at least a processor 104 receives new input data 112. In some embodiments, performance datum 184 may be stored in data store 128 and processor 104 may retrieve performance datum 184 from data store 128. In some embodiments, a user may manually input performance datum 184 into apparatus 100.

With continued reference to FIG. 1, for the purposes of this disclosure, a "performance metric" is a criterion to used evaluate input data to generate a performance datum. As a non-limiting example, performance metric 188 may include checklist completeness, length of texts in textual data 120, descriptiveness of texts in the textual data 120, a frequency of inputting input data 112, timeliness of inputting input data 112, image accuracy, image submission, and the like. For the purposes of this disclosure, "checklist completeness" refers to a performance metric that measures how thoroughly a user has addressed all required items of tasks in a checklist in input data. As a non-limiting example, processor 104 may analyze a checklist input of input data 112 to generate performance datum 184. For example, and without limitation, processor 104 may consider a percentage of items in a checklist completed or checked by a user 116; for instance, if a checklist has 10 required tasks and the user completes 8 of them, the checklist completeness would be 80%. For the purposes of this disclosure, "descriptiveness of texts in textual data" refers to a performance metric of a level of detail or clarity in textual data. As a non-limiting example, descriptiveness of texts in textual data 120 may measure how specific, informative, and detailed a user's written observations are (in textual data 120). For example, and without limitation, a vague comment like "floor is dirty" would score lower on descriptiveness compared to a detailed comment like "The floor near the exit is wet and slippery, posing a safety hazard." For the purposes of this disclosure, "frequency of inputting input data" refers to a performance metric of how often a user provides inputs over a defined period of time. For example, and without limitation, If a user 116 is expected to complete an environmental round daily but only performs it three times a week and inputs a comment or input data 112 three times a week, the frequency of inputs (input data 112) would be considered low, hence scored low. For the purposes of this disclosure, "length of texts in textual data" refers as a performance metric that measures the total word count or length of texts in textual data. For example, and without limitation, a comment in textual data 120 with just 10 words like "everything is fine" would score low on this metric, whereas a comment with 50-100 words explaining specific conditions in each area would score higher. As another non-limiting example, performance metric 188 may include pattern datum 164. For example, and without limitation, a comment that has a lot of duplicity may score lower than a comment that has less duplicity. For the purposes of this disclosure, "image accuracy" is a performance metric that measures whether an image contains a required object. In a non-limiting example, an image that has an extinguisher (e.g., required object) may score higher than an image that has a chair when a user 116 is performing a task in a checklist that is related to verifying a presence of an extinguisher during environmental round. For the purposes of this disclosure, "image submission" is a performance metric that measures whether a user submitted an image. In a non-limiting example, a user 116 did not submit an image of extinguisher may score lower than another user that submitted the image. In some embodiments, performance metric 188 may be stored in data store 128 and processor 104 may retrieve performance metric 188 from data store 128. In some embodiments, a user may manually input performance metric 188 into apparatus 100.

With continued reference to FIG. 1, in some embodiments, generating performance datum 184 may include analyzing images of input data 112 as a function of performance metrics 188 using a machine vision system. For the purposes of this disclosure, a "machine vision system" is a type of technology that enables a computing device to inspect, evaluate and identify still or moving images. In some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

With continued reference to FIG. 1, in some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and $\phi$ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

With continued reference to FIG. 1, in some embodiments, machine vision system may include an image classifier. Alternatively or additionally, identifying an object in an image of input data 112 may include classifying the object to a label of the object using an image classifier; the image classifier may be trained using a plurality of images of objects. The image classifier may be configured to determine which of a plurality of edge-detected shapes is closest to an attribute set of the object as determined by training using image training data and selecting the determined shape as the object. As a non-limiting example, the image classifier may be trained with image training data that correlates the plurality of images of objects to a label of the objects. For example and without limitation, the image training data may correlate a plurality of images of an extinguisher to a label of 'extinguisher.' Alternatively, identification of the object may be performed without using computer vision and/or classification; for instance, identifying the object may further include receiving, from a user or second user, an identification of the object in an image.

With continued reference to FIG. 1, in some embodiments, generating performance datum 184 may include analyzing input data 112 as a function of performance metrics 188 using a natural language processing module 192. For the purposes of this disclosure, a "natural language processing module" is a software component or system designed to perform tasks related to understanding, interpretation, and generation of human language using computational methods. Natural language processing module 192 may include algorithms, machine learning models, and linguistic rules to process and analyze textual data 120. In some embodiments, generating performance datum 184 may include generating performance training data 194. For the purposes of this disclosure, "performance training data" is data containing correlations that a machine-learning process may use to model relationships between textual data, pattern data and performance data. In some embodiments, performance training data 194 may include exemplary textual data, exemplary performance metrics and exemplary pattern data correlated to exemplary performance datums. In some embodiments, performance training data 194 may be stored in data store 128. In some embodiments, performance training data 194 may be received from one or more users, data store 128, external computing devices, and/or previous iterations of processing. As a non-limiting example, performance training data 194 may include instructions from a user, who may be an expert user, a past user in embodiments disclosed herein, or the like, which may be stored in memory and/or stored in data store 128, where the instructions may include labeling of training examples. In some embodiments, performance training data 194 may be updated iteratively on a feedback loop. As a non-limiting example, processor 104 may update performance training data 194 iteratively through a feedback loop as a function of textual data 120, input data 112, pattern datum 164, vector representations, and the like. In some embodiments, generating performance datum 184 may include training a performance machine-learning model 196 using the performance training data 194 and generating the performance datum 184 using the trained performance machine-learning model 196. For the purposes of this disclosure, a "performance machine-learning model" is a machine-learning model that generates a performance datum. In some embodiments, generating performance training data 194 may include updating the performance training data 194 as a function of an output of pattern machine-learning model 180 by adding correlations of pattern datum 164 and performance datum 184. In some embodiments, processor 104 may be configured to generate performance machine-learning model 196. In a non-limiting example, generating performance machine-learning model 196 may include training, retraining, or fine-tuning performance machine-learning model 196 using performance training data 194 or updated performance training data 194. In some embodiments, processor 104 may be configured to generate performance datum 184 for each user of plurality of users 116 using performance machine-learning model 196 (i.e. trained or updated performance machine-learning model 196). In some embodiments, users 116 or input data 112 may be classified to a user cohort using a cohort classifier. Cohort classifier may be consistent with any classifier discussed in this disclosure. Cohort classifier may be trained on cohort training data, wherein the cohort training data may include users 116 or input data 112 correlated to user cohorts. In some embodiments, a user may be classified to a user cohort and processor 104 may generate performance datum 184 the user cohort using a machine-learning module as described in detail with respect to FIG. 4 and the resulting output may be used to update performance training data 194. In some embodiments, generating training data and training machine-learning models may be simultaneous.

With continued reference to FIG. 1, memory 108 contains instructions configuring processor 104 to transmit a performance datum 184 to a plurality of user devices 124. In some embodiments, processor 104 may be configured to generate a user interface 198 to display performance datum 184 on a plurality of user devices 124. In some embodiments, processor 104 may transmit performance datum 184 to a plurality of user devices 124 through chatbot. For the purposes of this disclosure, a "user interface" is a means by which a user and a computer system interact. For example, and without limitation, a user and a computer system may interact through the use of input devices (e.g., user device 124) and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 104. For example, a smart phone, smart, tablet, or laptop operated by a user 116. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

Figure 2A:
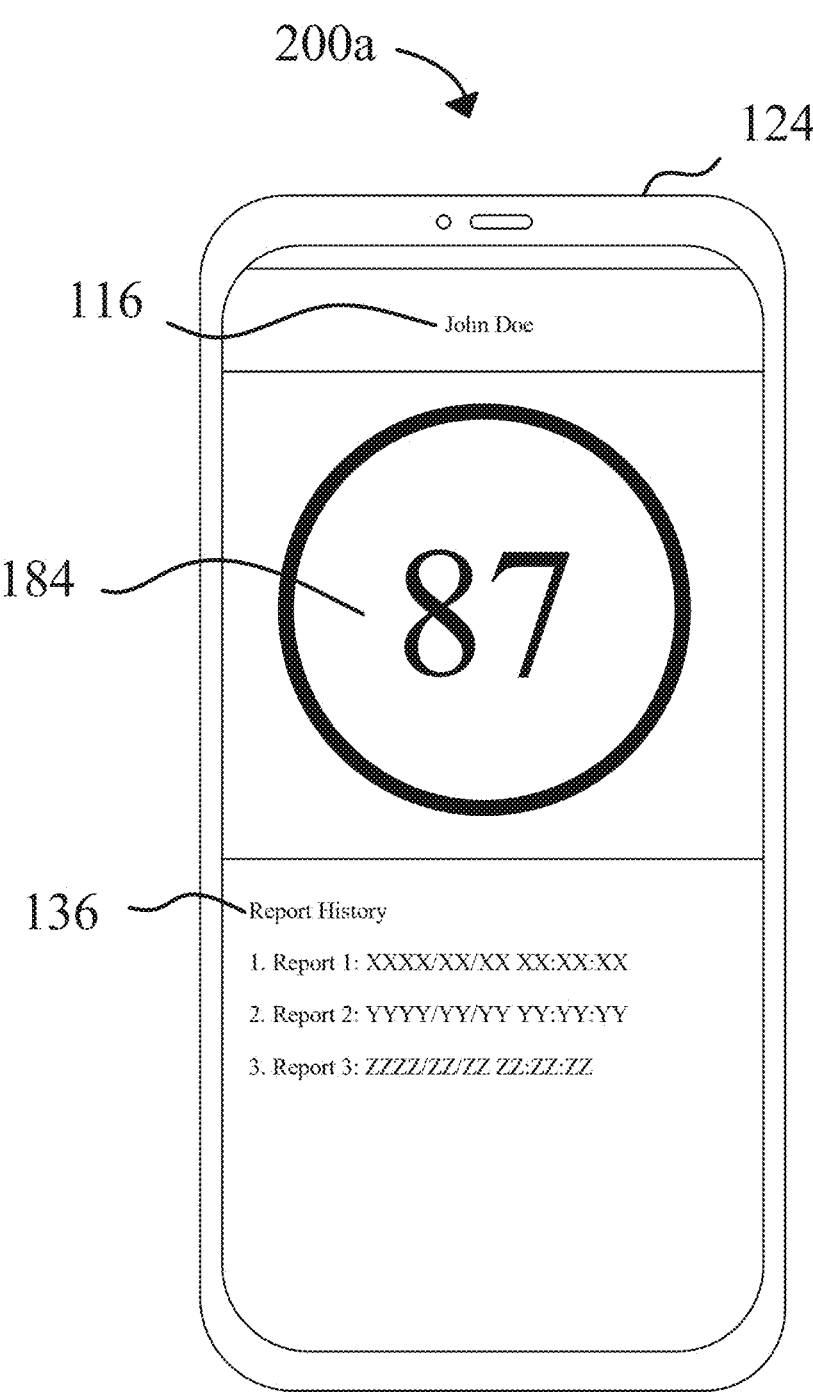
FIG. 2A illustrates an exemplary user interface displaying a performance datum on a user device.

Referring to FIG. 2A, an exemplary user interface 200*a* displaying a performance datum 184 on a user device 124. In some embodiments, processor 104 may generate user interface 200*a* to display performance datum 184, input data 112, textual data 120, and the like on user device 124. In a non-limiting example, user interface 200*a* may display historical textual data 136, showing each piece of textual data 120 or input data 112 entered by a user 116. In some embodiments, the user 116 may click or select one of the historical textual data 136 entries to view the associated performance datum 184 for each respective textual data 120 or input data 112. For instance, without limitation, the performance datum 184 displayed on user device 124 could be an overall score for every textual data 120 or input data 112 inputted by a user 116. When the user 116 selects a specific textual data 120 or input data 112, processor 104 may display an individual score for that specific textual data 120 or input data 112.

Figure 2B:
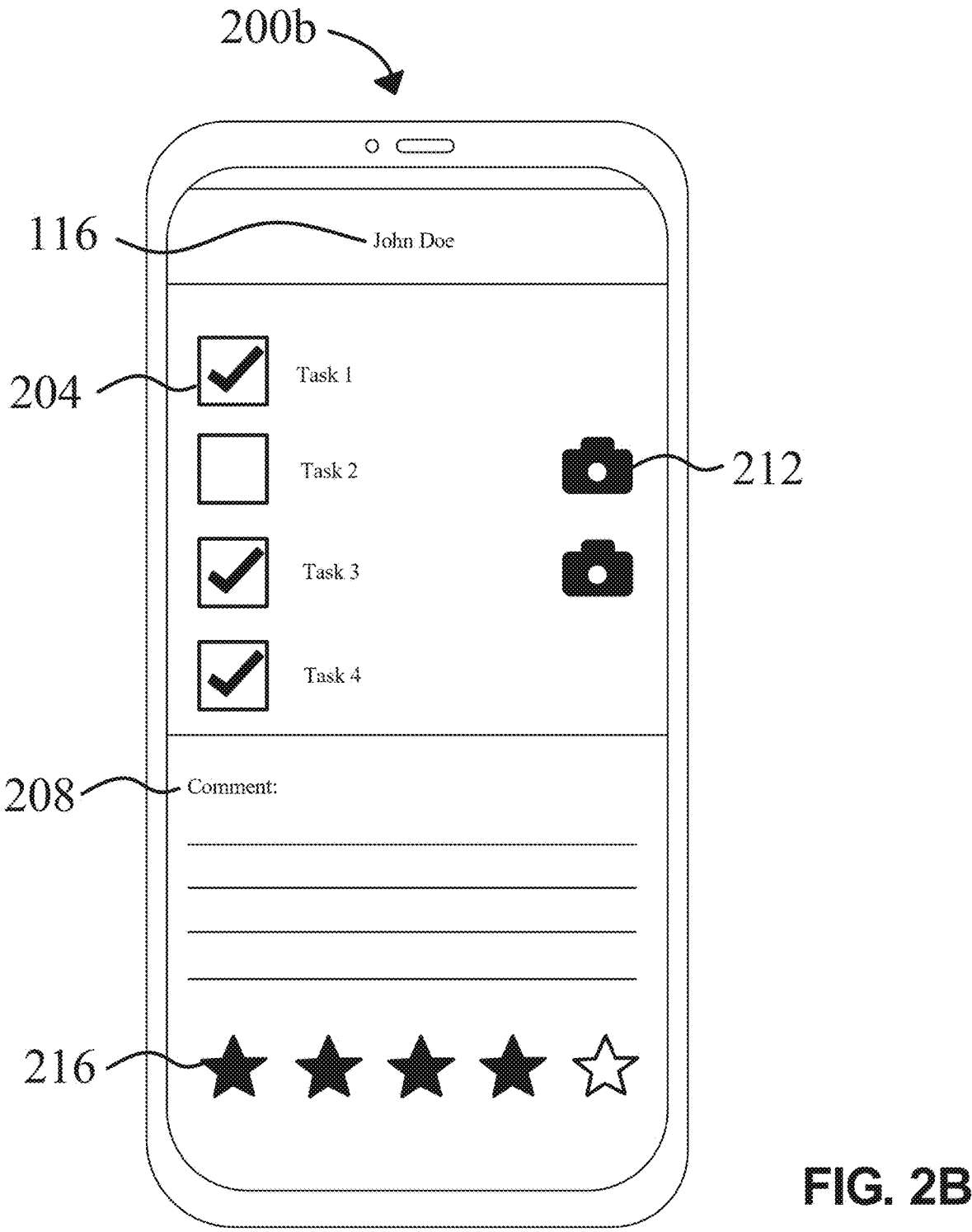
FIG. 2B illustrates an exemplary user interface for a user to input data into an apparatus.

Referring now to FIG. 2B, an exemplary user interface 200*b* for a user to input data into apparatus 100 is illustrated. In some embodiments, user interface 200*b* may display a checklist 204 containing a plurality of tasks for a user 116 to complete. In a non-limiting example, checklist 204 may include a list of tasks for a user 116 to accomplish; for instance, the tasks may be related to environmental round. In some embodiments, user 116 may input textual data 120 into a comment section 208 in user interface 200*b*. In some embodiments, user interface 200*b* may include a graphical user interface (GUI) element that allows a user 116 to interact to input data (e.g., input data 112). As a non-limiting example, user 116 may click on a camera button 212 to input images (e.g., image of input data 112). As another non-limiting example, user 116 may input ratings of an overall environmental round using a grade or number of stars 216.

Figure 3:
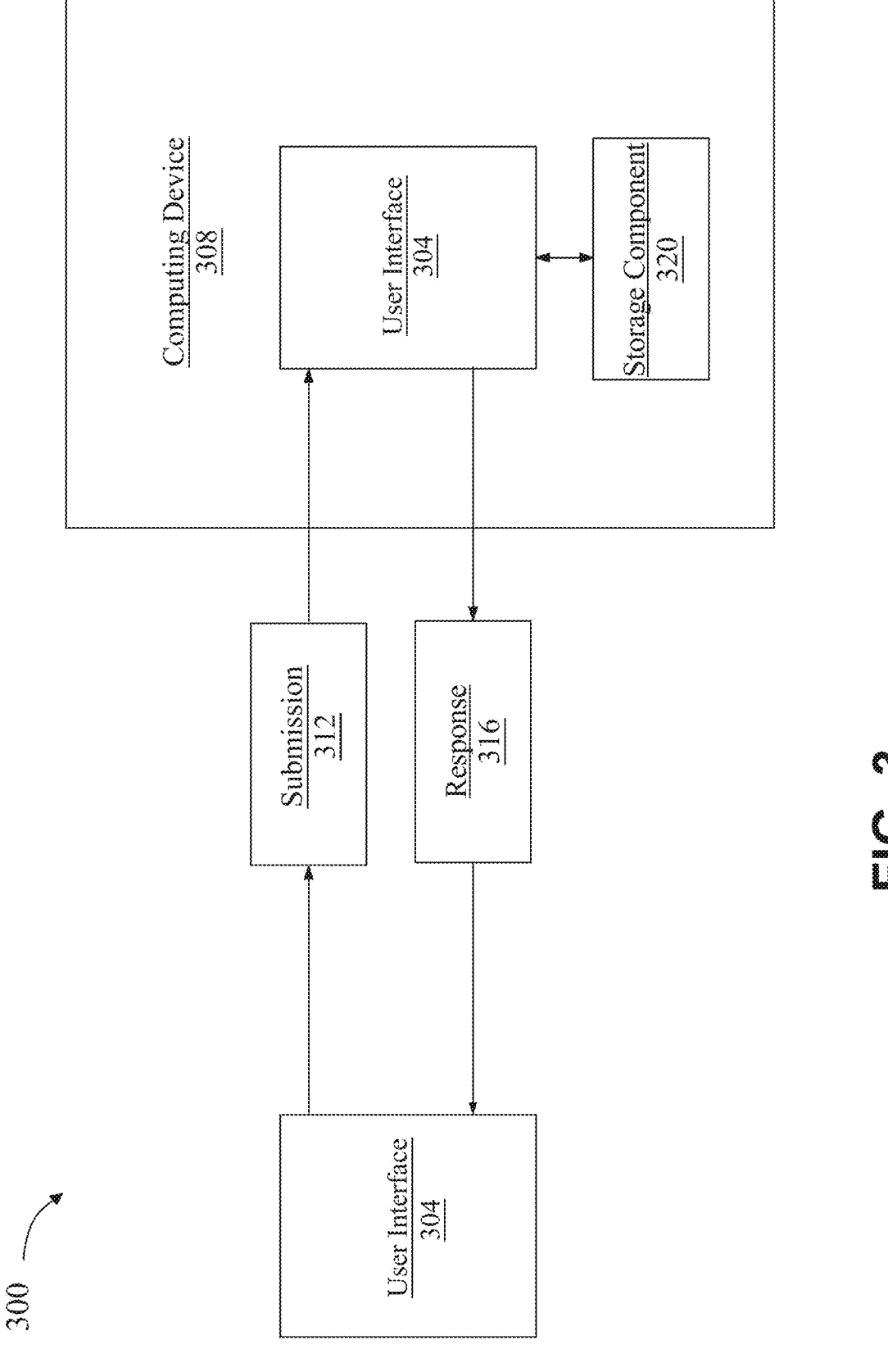
FIG. 3 illustrates an exemplary chatbot system.

Referring to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively or additionally, in some cases, user interface 304 may remote to computing device 308 and communicative with the computing device 308, by way of one or more networks, such as without limitation the internet. Alternatively or additionally, user interface 304 may communicate with computing device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 304 to the chatbot, and a response 316, from the chatbot to the user interface 304. In many cases, one or both of submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor. In some embodiments, processor processes a submission 312 using one or more of keyword recognition, pattern matching, and natural language processing. In some embodiments, processor employs real-time learning with evolutionary algorithms. In some cases, processor may retrieve a pre-prepared response from at least a storage component 320, based upon submission 312. Alternatively or additionally, in some embodiments, processor communicates a response 316 without first receiving a submission 312, thereby initiating conversation. In some cases, processor communicates an inquiry to user interface 304; and the processor is configured to process an answer to the inquiry in a following submission 312 from the user interface 304. In some cases, an answer to an inquiry present within a submission 312 from a user interface 304 may be used by computing device 308 as an input to another function.

With continued reference to FIG. 3, a chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, data base, or other data structure to respond to the users entry into the chatbot as a function of a chatbot input. As used in the current disclosure, "chatbot input" is any response that a user inputs in to a chatbot as a response to a prompt or question.

With continuing reference to FIG. 3, computing device 308 may be configured to the respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a candidate input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 308 may generate two or more decision trees, which may overlap; for instance, a root node of one tree may connect to and/or receive output from one or more terminal nodes of another tree, intermediate nodes of one tree may be shared with another tree, or the like.

Still referring to FIG. 3, computing device 308 may build decision tree by following relational identification; for example, relational indication may specify that a first rule module receives an input from at least a second rule module and generates an output to at least a third rule module, and so forth, which may indicate to computing device 308 an in which such rule modules will be placed in decision tree.

Building decision tree may include recursively performing mapping of execution results output by one tree and/or subtree to root nodes of another tree and/or subtree, for instance by using such execution results as execution parameters of a subtree. In this manner, computing device 308 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 3, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 4:
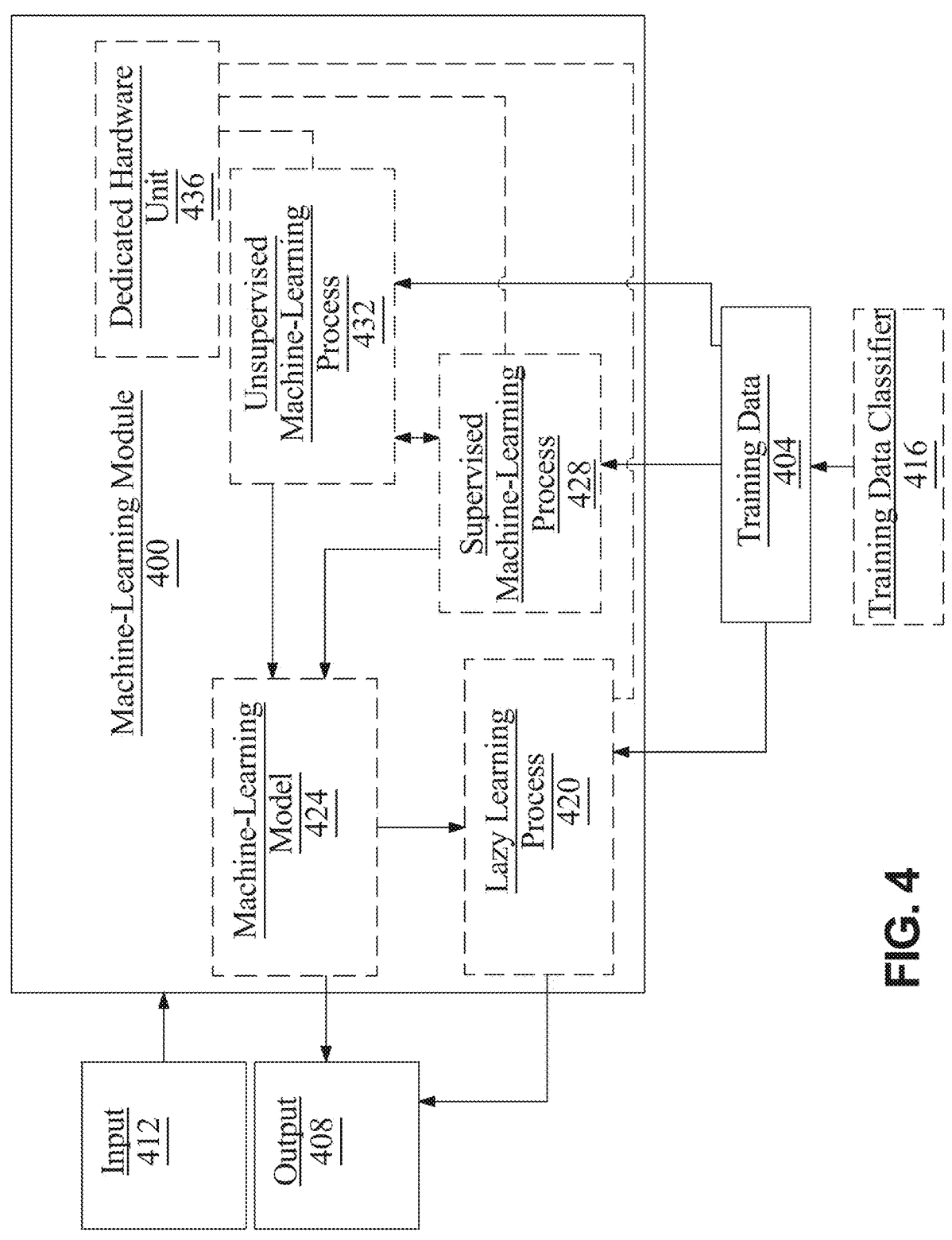
FIG. 4 illustrates a block diagram of an exemplary machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, input data may include input data 112, textual data 120, referential textual data 132, segments 144, referential segments 148, encoded vector representations 156, encoded referential vector representations 160, pattern datum 164, performance metric 188, and the like. As a non-limiting illustrative example, output data may include segments 144, referential segments 148, encoded vector representations 156, encoded referential vector representations 160, pattern datum 164, performance metric 188, performance datum 184, and the like.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to a user cohort related to a user's age, gender, position, responsibilities, departments, and the like.

Still referring to FIG. 4, computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)\ P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below.

Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input data 112, textual data 120, referential textual data 132, segments 144, referential segments 148, encoded vector representations 156, encoded referential vector representations 160, pattern datum 164, performance metric 188, and the like as described above as inputs, segments 144, referential segments 148, encoded vector representations 156, encoded referential vector representations 160, pattern datum 164, performance metric 188, performance datum 184, and the like.as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
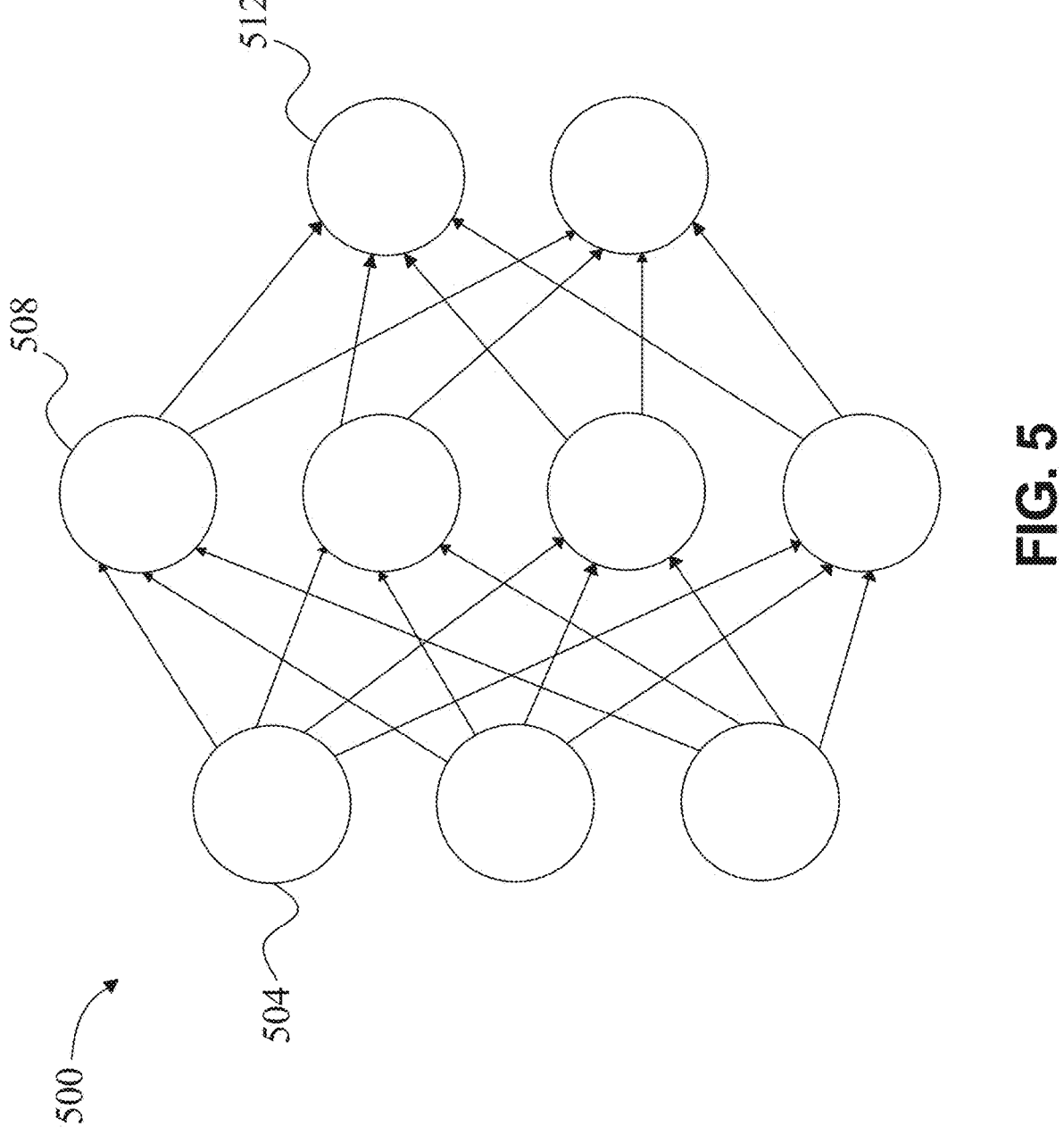
FIG. 5 illustrates a diagram of an exemplary neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
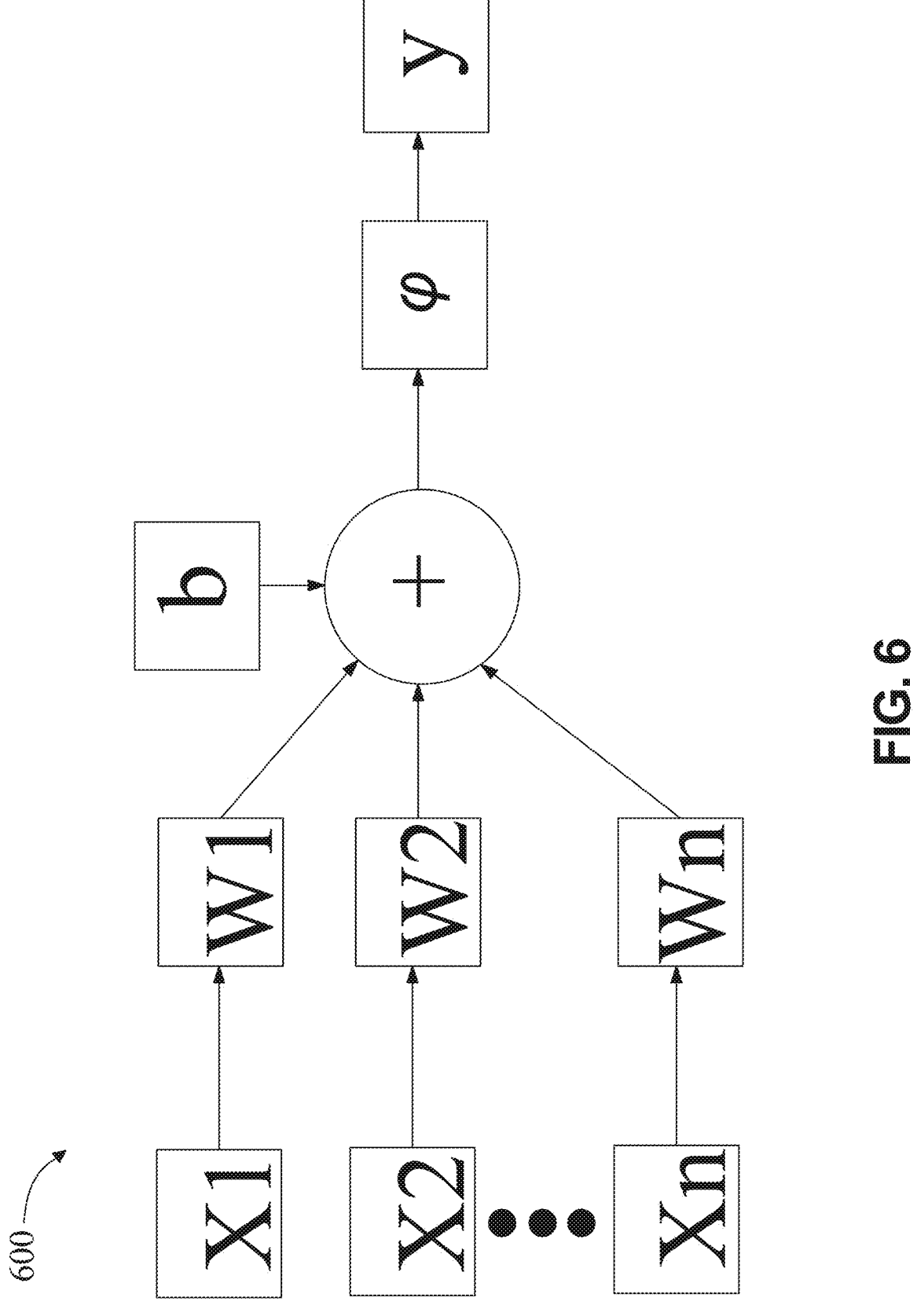
FIG. 6 illustrates a block diagram of an exemplary node in a neural network.

Referring now to FIG. 6, an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(\alpha x, x)$ for some $\alpha$, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x^*\text{sigmoid}(x)$, a Gaussian error linear unit function such as $$f(x) = a\left(1 + \tanh\left(\sqrt{2/\pi}\,(x + bx^r)\right)\right)$$

for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\varphi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
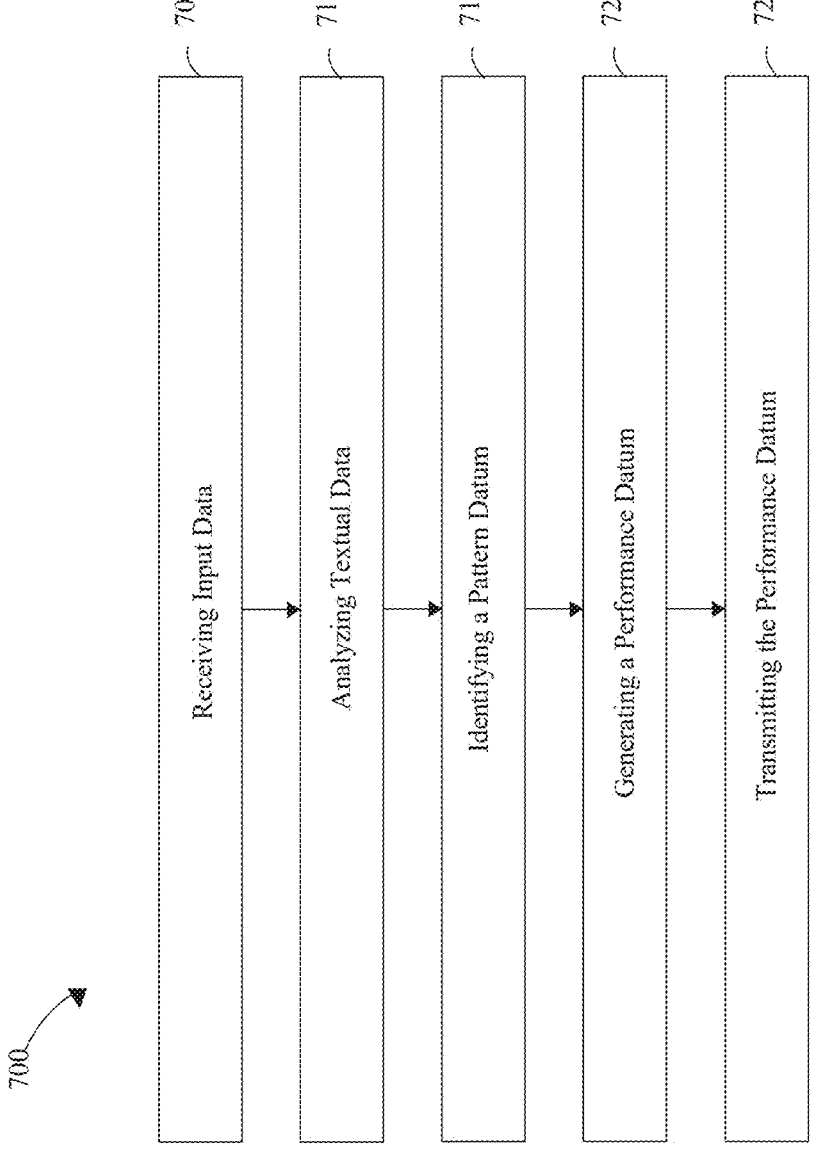
FIG. 7 illustrates a flow diagram of an exemplary method for textual data analysis and generation of a performance datum.

Referring now to FIG. 7, a flow diagram of an exemplary method 700 for textual data analysis and generation of a performance datum is illustrated. Method 700 contains a step 705 of receiving, using at least a processor, input data from a plurality of users, wherein the input data includes textual data. This may be implemented as reference to FIGS. 1-6.

With continued reference to FIG. 7, method 700 contains a step 710 of analyzing, using at least a processor, textual data as a function of referential textual data, wherein analyzing the textual data includes segmenting the textual data and the referential textual data into a plurality of segments and a plurality of referential segments respectively and encoding the plurality of segments and the plurality of referential segments using an encoder, wherein the encoder is configured to convert each segment into a vector representation. In some embodiments, the referential textual data may include a second user input. These may be implemented as reference to FIGS. 1-6.

With continued reference to FIG. 7, method 700 contains a step 715 of identifying, using at least a processor, a pattern datum between a plurality of segments and a plurality of referential segments by comparing encoded vector representations of the plurality of segments to encoded referential vector representations of the plurality of referential segments, wherein identifying the pattern datum includes generating pattern training data, wherein the pattern training data includes pairs of texts and corresponding similarity labels indicating whether the pairs are semantically similar, training a pattern machine-learning model using the pattern training data and identifying the pattern datum using the trained pattern machine-learning model as a function of an output of the encoder. In some embodiments, identifying the pattern datum may include generating a second user prompt as a function of the pattern datum, wherein the pattern datum may include dissimilarity between the plurality of segments and the plurality of referential segments. In some embodiments, identifying the pattern datum may include iteratively updating the pattern training data as a function of the textual data by adding correlations between the textual data and the pattern datum. These may be implemented as reference to FIGS. 1-6.

With continued reference to FIG. 7, method 700 contains a step 720 of generating, using at least a processor, a performance datum for each user of a plurality of users as a function of input data, a pattern datum and a plurality of performance metrics. In some embodiments, the plurality of performance metrics may include a frequency of inputting the input data. In some embodiments, the plurality of performance metrics may include checklist completeness. In some embodiments, the plurality of performance metrics may include length of texts in the textual data. In some embodiments, generating the performance datum may include analyzing the input data as a function of the plurality of performance metrics using a natural language processing module, wherein the plurality of performance metrics may include descriptiveness of texts in the textual data. In some embodiments, generating the performance datum may include generating performance training data, wherein the performance training data may include exemplary textual data and exemplary pattern data correlated to exemplary performance datums, training a performance machine-learning model using the performance training data and generating the performance datum using the trained performance machine-learning model. In some embodiments, generating the performance training data may include updating the performance training data as a function of an output of the pattern machine-learning model by adding correlations of the pattern datum and the performance datum. These may be implemented as reference to FIGS. 1-6.

With continued reference to FIG. 7, method 700 contains a step 725 of transmitting, using at least a processor, a performance datum to a plurality of user devices. This may be implemented as reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
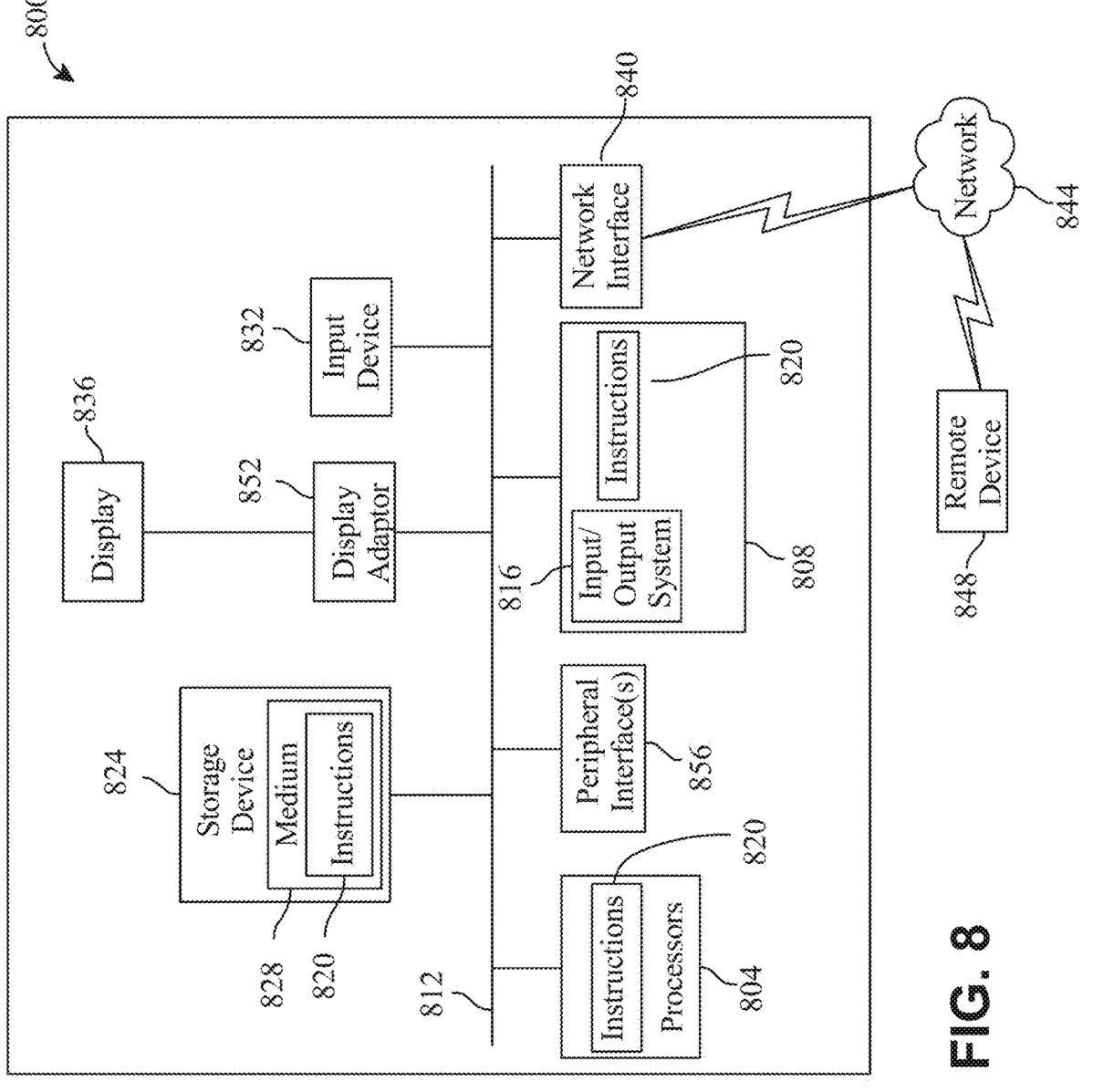
FIG. 8 illustrates a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and memory 808 that communicate with each other, and with other components, via a bus 812.

Bus 812 may include any of several types of bus structures including, but not limited to, memory bus, memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device (e.g., a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display 836. Examples of a display device include, but are not limited to, a liquid crystal display (LCD), a cathode ray tube (CRT), a plasma display, a light emitting diode (LED) display, and any combinations thereof. Display adapter 852 and display 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for textual data analysis and generation of a performance datum, the apparatus comprising:

at least a processor; and a memory communicatively connected to the at least a processor, wherein the memory contains instructions configuring the at least a processor to:

receive input data from a plurality of users, wherein the input data comprises textual data and includes data aimed at ensuring compliance with safety and regulatory requirements;

analyze the textual data as a function of referential textual data comprising exemplar descriptions associated with an environment in which the textual data was generated, wherein analyzing the textual data comprises:

segmenting the textual data and the referential textual data into a plurality of segments and a plurality of referential segments respectively; and encoding the plurality of segments and the plurality of referential segments using an encoder, wherein the encoder is configured to convert each segment into a vector representation;

identify a pattern datum between the plurality of segments and the plurality of referential segments by comparing the encoded vector representations of the plurality of segments to the encoded referential vector representations of the plurality of referential segments, wherein identifying the pattern datum comprises:

generating pattern training data, wherein the pattern training data comprises pairs of texts and corresponding similarity labels indicating whether the pairs are semantically similar;

training a pattern machine-learning model using the pattern training data; and identifying the pattern datum using the trained pattern machine-learning model as a function of an output of the encoder;

generate a performance datum of each user of the plurality of users as a function of the input data, the pattern datum and a plurality of performance metrics comprising a frequency of receipt of the input data, wherein the performance datum comprises a level of completeness of the safety and regulatory requirements; and transmit the performance datum of each user to a at least a user device.

2. The apparatus of claim 1, wherein the referential textual data comprises a second user input.

3. The apparatus of claim 1, wherein identifying the pattern datum comprises iteratively updating the pattern training data as a function of the textual data by adding correlations between the textual data and the pattern datum.

4. The apparatus of claim 1, wherein identifying the pattern datum comprises generating a prompt to a second user as a function of the pattern datum, wherein the pattern datum comprises dissimilarity between the plurality of segments and the plurality of referential segments.

5. The apparatus of claim 1, wherein the plurality of performance metrics comprises a frequency of inputting the input data.

6. The apparatus of claim 1, wherein the plurality of performance metrics comprises checklist completeness.

7. The apparatus of claim 1, wherein the plurality of performance metrics comprises length of text in the textual data.

8. The apparatus of claim 1, wherein generating the performance datum comprises analyzing the input data as a function of the plurality of performance metrics using a natural language processing module, wherein the plurality of performance metrics comprises descriptiveness of texts in the textual data.

9. The apparatus of claim 1, wherein generating the performance datum comprises:

generating performance training data, wherein the performance training data comprises exemplary textual data and exemplary pattern data correlated to exemplary performance data;

training a performance machine-learning model using the performance training data; and generating the performance datum using the trained performance machine-learning model.

10. The apparatus of claim 9, wherein generating the performance training data comprises updating the performance training data as a function of an output of the pattern machine-learning model by adding correlations of the pattern datum and the performance datum.

11. A method for textual data analysis and generation of a performance datum, the method comprising:

receiving, using at least a processor, input data from a plurality of users, wherein the input data comprises textual data and includes data aimed at ensuring compliance with safety and regulatory requirements;

analyzing, using the at least a processor, the textual data as a function of referential textual data comprising exemplar descriptions associated with an environment in which the textual data was generated, wherein analyzing the textual data comprises:

segmenting the textual data and the referential textual data into a plurality of segments and a plurality of referential segments respectively; and encoding the plurality of segments and the plurality of referential segments using an encoder, wherein the encoder is configured to convert each segment into a vector representation;

identifying, using the at least a processor, a pattern datum between the plurality of segments and the plurality of referential segments by comparing the encoded vector representations of the plurality of segments to the encoded referential vector representations of the plurality of referential segments, wherein identifying the pattern datum comprises:

generating pattern training data, wherein the pattern training data comprises pairs of texts and corresponding similarity labels indicating whether the pairs are semantically similar;

training a pattern machine-learning model using the pattern training data; and identifying the pattern datum using the trained pattern machine-learning model as a function of an output of the encoder;

generating, using the at least a processor, a performance datum for each user of the plurality of users as a function of the input data, the pattern datum and a plurality of performance metrics comprising a frequency of receipt of the input data, wherein the performance datum comprises a level of completeness of the safety and regulatory requirements; and transmitting, using the at least a processor, the performance datum to at least a user device.

12. The method of claim 11, wherein the referential textual data comprises a second user input.

13. The method of claim 11, wherein identifying the pattern datum comprises iteratively updating the pattern training data as a function of the textual data by adding correlations between the textual data and the pattern datum.

14. The method of claim 11, wherein identifying the pattern datum comprises generating a prompt to a second user as a function of the pattern datum, wherein the pattern datum comprises dissimilarity between the plurality of segments and the plurality of referential segments.

15. The method of claim 11, wherein the plurality of performance metrics comprises a frequency of inputting the input data.

16. The method of claim 11, wherein the plurality of performance metrics comprises checklist completeness.

17. The method of claim 11, wherein the plurality of performance metrics comprises length of text in the textual data.

18. The method of claim 11, wherein generating the performance datum comprises analyzing the input data as a function of the plurality of performance metrics using a natural language processing module, wherein the plurality of performance metrics comprises descriptiveness of texts in the textual data.

19. The method of claim 11, wherein generating the performance datum comprises:

generating performance training data, wherein the performance training data comprises exemplary textual data and exemplary pattern data correlated to exemplary performance datums;

training a performance machine-learning model using the performance training data; and generating the performance datum using the trained performance machine-learning model.

20. The method of claim 19, wherein generating the performance training data comprises updating the performance training data as a function of an output of the pattern machine-learning model by adding correlations of the pattern datum and the performance datum.

* * * * *